United States Patent
Kaczmarski et al.

(10) Patent No.: US 7,747,586 B2
(45) Date of Patent: Jun. 29, 2010

(54) APPARATUS AND METHOD TO MAP AND COPY COMPUTER FILES

(75) Inventors: Michael Allen Kaczmarski, Tucson, AZ (US); Donald P. Warren, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/421,450

(22) Filed: Apr. 23, 2003

(65) Prior Publication Data
US 2004/0215628 A1 Oct. 28, 2004

(51) Int. Cl.
*G06F 17/30* (2006.01)
(52) U.S. Cl. .................. 707/694; 707/655; 711/162
(58) Field of Classification Search ............. 707/100, 707/202, 204, 205, 694; 711/162
See application file for complete search history.

(56) References Cited

U.S. PATENT DOCUMENTS

| | | | | |
|---|---|---|---|---|
| 5,276,860 A | | 1/1994 | Fortier et al. ................ 395/575 |
| 5,642,496 A | | 6/1997 | Kanfi ......................... 395/489 |
| 5,659,614 A | | 8/1997 | Bailey, III .................... 380/4 |
| 5,765,173 A | | 6/1998 | Cane et al. ................... 707/204 |
| 5,778,395 A | | 7/1998 | Whiting et al. ............. 707/204 |
| 5,794,254 A | | 8/1998 | McClain ...................... 707/204 |
| 5,835,953 A | * | 11/1998 | Ohran .......................... 711/162 |
| 5,990,810 A | | 11/1999 | Williams ....................... 341/51 |
| 6,038,490 A | | 3/2000 | Dimitri et al. ............... 700/214 |
| 6,049,874 A | | 4/2000 | McClain et al. ............. 713/176 |
| 6,226,759 B1 | * | 5/2001 | Miller et al. .................... 714/6 |
| 6,510,500 B2 | * | 1/2003 | Sarkar .......................... 711/162 |
| 6,675,177 B1 | * | 1/2004 | Webb ........................... 707/200 |
| 6,772,308 B1 | * | 8/2004 | Ohr ............................. 711/163 |
| 6,847,984 B1 | * | 1/2005 | Midgley et al. .............. 707/204 |
| 7,016,982 B2 | * | 3/2006 | Basham ........................ 710/5 |
| 7,043,485 B2 | * | 5/2006 | Manley et al. ............... 707/100 |
| 7,225,204 B2 | * | 5/2007 | Manley et al. ............... 707/200 |
| 2002/0083120 A1 | * | 6/2002 | Soltis .......................... 709/200 |
| 2003/0140070 A1 | * | 7/2003 | Kaczmarski et al. ........ 707/204 |
| 2003/0225966 A1 | * | 12/2003 | Frandsen .................... 711/111 |
| 2004/0093361 A1 | * | 5/2004 | Therrien et al. ............. 707/204 |

OTHER PUBLICATIONS

IBM Tivoli, "Tivoli Storage Manager for Windows Using the Backup-Archive Client," IBM Docket No. SH26-4117-01, pp. 1-456.
IBM Tivoli, "Tivoli Storage Manager for Windows Administrator's Guide", IBM Docket No. GC35-0410-02, pp. 1-680.
IBM Tivoli, "Tivoli Storage Manager for Windows Administrator's Reference," IBM Docket No. GC35-0411-02, pp. Jan. 1098.

* cited by examiner

*Primary Examiner*—Apu M Mofiz
*Assistant Examiner*—Monica M Pyo
(74) *Attorney, Agent, or Firm*—Dale F. Regelman; Quarles & Brady LLP

(57) ABSTRACT

A method to copy computer files, where that method includes receiving a computer file, mapping that file to its constituent blocks, generating meta-data describing those constituent blocks, saving that meta-data in a memory device, and copying the file to one or more information storage media, where the mapping step, the generating step, and the saving step, are performed substantially synchronously, and where the copying step is performed at a later time. A data storage and retrieval system comprising a computer useable medium having computer readable program code disposed therein to copy computer files on one or more information storage media disposed therein. A computer program product usable with a programmable computer processor having computer readable program code embodied therein for copying computer files.

9 Claims, 7 Drawing Sheets

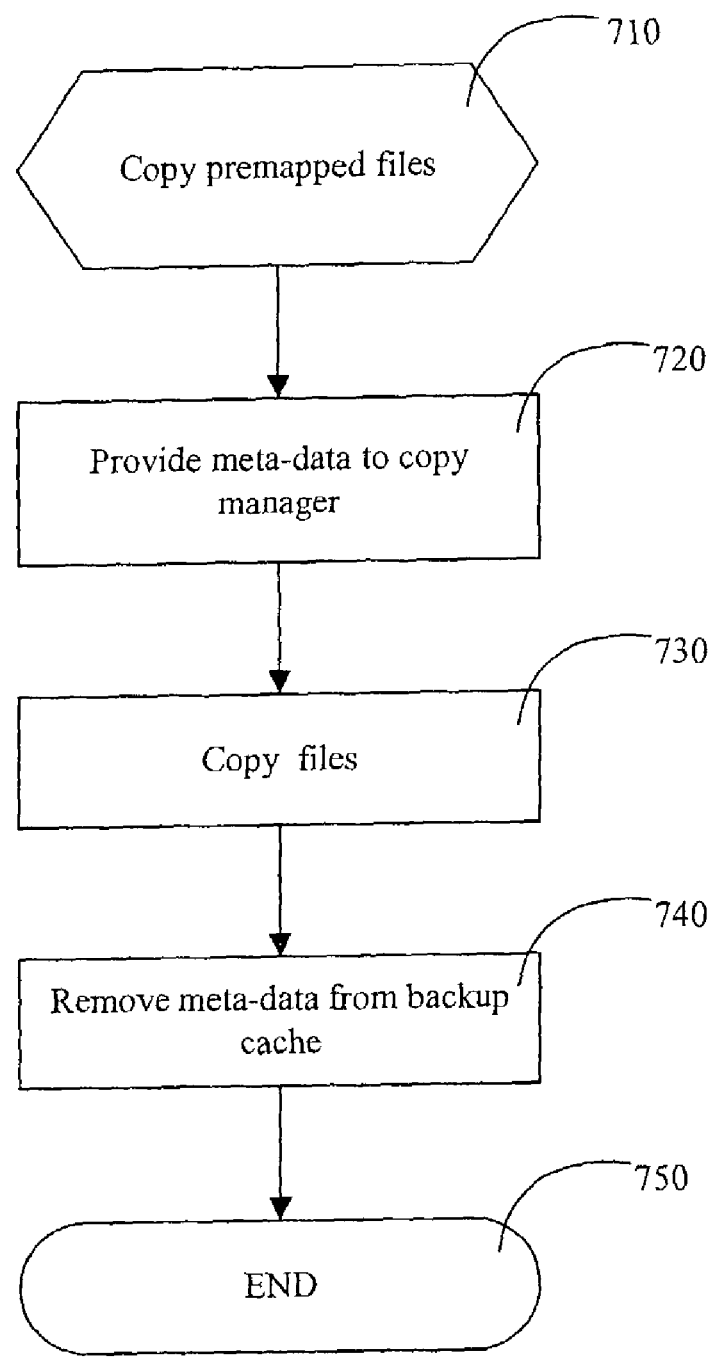

APPARATUS AND METHOD TO MAP AND COPY COMPUTER FILES

FIELD OF THE INVENTION

Applicant's invention relates to an apparatus and method to copy computer files. In certain embodiments, the computer files comprise host computer files, and those host computer files are copied to portable information storage media disposed in Applicant's data storage and retrieval system.

BACKGROUND OF THE INVENTION

Irretrievable loss of information stored in a computer system is highly undesirable. As a general matter, information is stored in a computer system in one or more files. To prevent loss of data, computer files are typically "backed up" periodically. Copies of computer files, i.e. backup files, are created and stored in a location separate from the file-generating computer systems. Such backup files allow recovery of information in the event of a system crash, natural disaster, or operator error that causes data stored on the system to be destroyed or lost.

One problem associated with backing up computer files is the speed of the process, i.e., the time required to create and write such a backup file. Often either the backup media or the connection between the computer system and the backup media is limited to data transfer rates which are substantially slower than the speed of the computer system on which the data is stored. For example, when backing up a host computer to a data storage device, such as a tape drive, over a network, the software orchestrating the creation and saving of the backup file, and the data transfer rate of the data storage device, are likely to be limiting factors in the overall speed of backup file creation and storage. Allocating substantial amounts of the host computer's time and resources to create and save backup files is undesirable.

Automated media storage libraries are known for providing cost effective access to large quantities of stored information, such as backup computer files. Generally, media storage libraries include a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like, One (or more) accessors typically retrieve portable data storage media from the storage slots and deliver that accessed media to a data storage device for reading and/or writing data thereon. Suitable electronics operate the accessor(s) and operate the data storage device(s) to provide information to, and/or to receive information from, one or more attached host computer systems.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM TotalStorage™ 3584 Enterprise Tape Library. Some of the automated media storage libraries have dual or multiple accessors to provide a level of redundancy and to enhance performance.

In order to most efficiently backup information stored on a host computer what is needed is a method employing time efficient copy protocols, i.e. fast software, in combination with a communication link having a high data transfer rate to a data storage device, where that method minimizes the overhead processing time required by the host computer, to create and save backup files on cost-effective data storage media.

SUMMARY OF THE INVENTION

Applicants' invention comprises a method and apparatus to copy computer files wherein those computer files are first mapped to their constituents blocks, with certain information, sometimes called meta-data, generated during that mapping being saved in one or more memory devices in order for that the meta-data to be used at a later time during a copy operation. Applicants' method receives a computer file from one or more host computers, maps that computer file to one or more constituent blocks, generates meta-data describing those one or more constituent blocks, and stores that meta-data in a memory device. Applicants' method subsequently provides that meta-data to a copy manager, and copies the computer file to one or information storage media.

Applicants' invention further includes an article of manufacture which includes a computer useable medium having computer readable program code disposed therein for implementing Applicant's method to copy computer files. Applicants' invention further includes a computer program product usable with a programmable computer processor having computer readable program code embodied therein for copying computer files. The programming of the present invention may comprise a computer program product embodied as program code stored in a storage device, such as a magnetic disk drive or memory, etc., in a computer, or may comprise an article of manufacture, such as a CD ROM, magnetic tape, etc.

BRIEF DESCRIPTION OF THE DRAWINGS

The invention will be better understood from a reading of the following detailed description taken in conjunction with the drawings in which like reference designators are used to designate like elements, and in which:

FIG. 7 is a flowchart summarizing the steps of Applicant's method to asynchronously copy one or more mapped computer files.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for backing up information in a data processing environment. The following description of Applicant's apparatus and method is not meant, however, to limit Applicant's invention to use of portable information storage media, to creating backup copies of files, or to data processing applications, as the invention herein can be applied to copying of computer files in general. In addition to copying computer files to portable data storage media, Applicant's method and apparatus can be used to copy computer files to non-portable data storage media, including one or more hard disks, and/or one or more arrays of hard disks.

Figure 3:
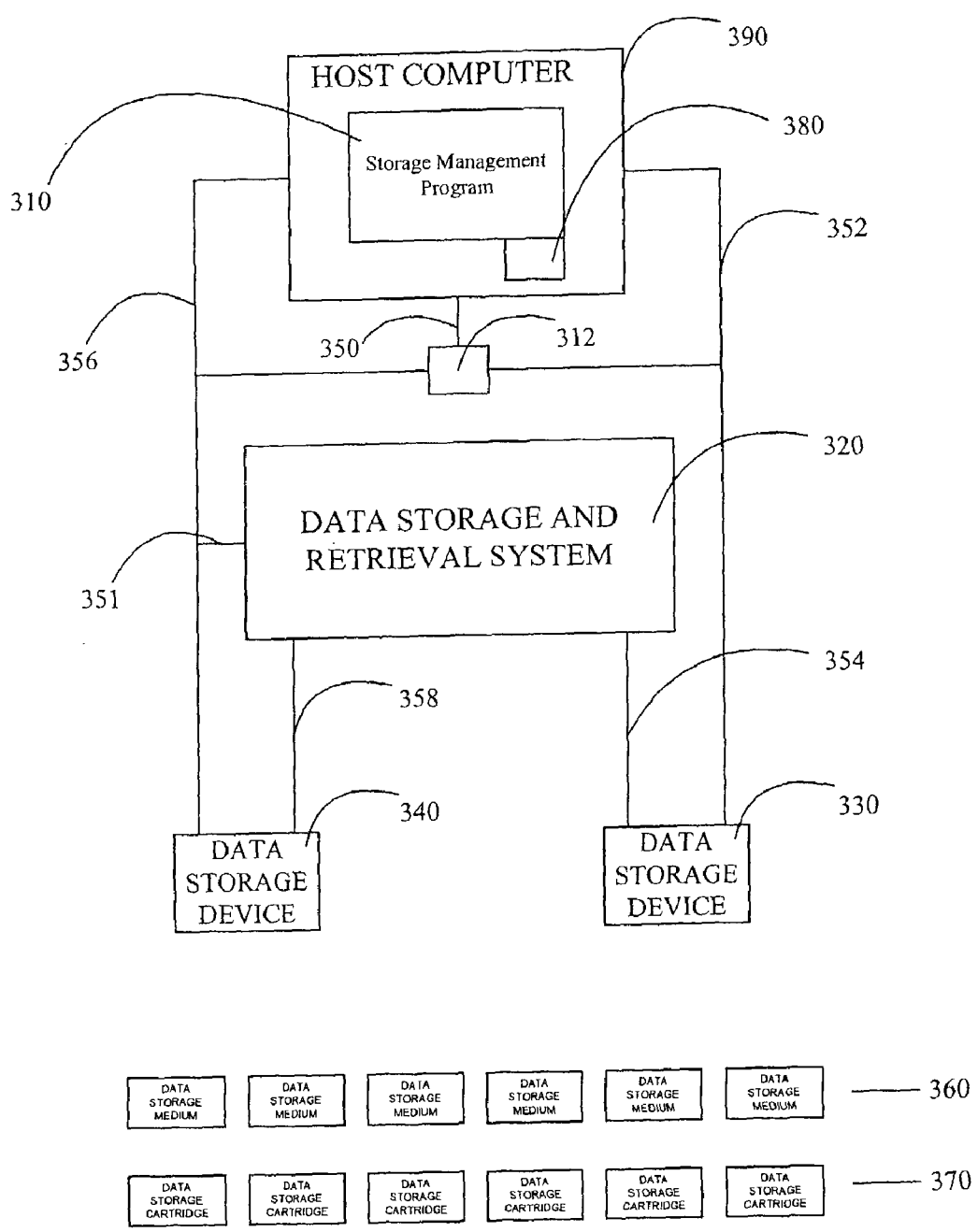
FIG. 3 is a block diagram showing the components of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

In certain embodiments, host computer 390 further includes backup cache 380. In certain embodiments, backup cache 380 is external to host computer 390. In certain embodiments, backup cache 380 includes one or more hard disks disposed in one or more hard disk drives. In certain embodiments, backup cache 380 comprises one or more direct access storage devices ("DASD"). In certain embodiments, DASD 380 comprises a redundant array of independent disks ("RAID"). In certain embodiments, such an array of disks utilizes one or more the known RAID data storage protocols.

Information is transferred between the host system 390 and secondary storage devices managed by a data storage and retrieval system, such as data storage and retrieval system 320, via communication links 351, 352, and 356. Copy manager 312 communicates with host computer 390 via communication link 350. Communication links 350, 351, 352, and 356, comprise a serial interconnection, such as an RS-232 cable or an RS-432 cable, an ethernet interconnection, a gigabit ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data storage devices 330 and 340. In other embodiments, Applicants' data storage and retrieval system 320 includes more than two data storage devices. In other embodiments, Applicants' data storage and retrieval system 320 includes one data storage device.

A plurality of information storage media 360 are disposed within Applicants' data storage and retrieval system. In certain embodiments, the one or more of information storage media 360 are individually housed in a one or more portable data storage cartridges 370. Each of such portable data storage cartridges may be removeably disposed in an appropriate data storage device.

Data storage and retrieval system 320 further includes program logic to manage data storage devices 330 and 340, plurality of information storage media 360, and plurality of portable data storage cartridges 370. Data storage and retrieval system 320 communicates with data storage device 330 using communication link 354. Data storage and retrieval system 320 communicates with data storage device 340 using communication link 358. Communication links 354 and 358 comprise a serial interconnection, such as an RS-232 cable or an RS-432 cable, an ethernet interconnection, a gigabit ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, communication links 350, 351, 352, 354, 356, and 358, comprise a Fibre Channel architecture. As those skilled in the art will appreciate, Fibre Channel ("FC") is a high-speed serial data transfer interface that can be used to connect systems and storage in point-to-point or switched topologies. Fibre Channel Arbitrated Loop (FC-AL), developed with storage connectivity in mind supports copper media and loops containing up to 126 devices, or nodes. FC-AL loops are hot-pluggable and tolerant of failures.

In certain Fibre Channel architecture embodiments, Applicant's communication links 350, 351, 352, 354, 356, and 358, support bandwidths of 133 Mb/sec., 266 Mb/sec., 532 Mb/sec., 1.0625 Gb/sec. In certain embodiments, communication links 350, 352, 354, 356, and 358, support bandwidths as high as 4 Gb/sec. at distances of up to ten kilometers. In embodiments using a Gigabit Fibre Channel architecture, data and control interconnection achieves a maximum data rate of 100 MB/sec. (200 MB/sec. full-duplex) after accounting for overhead.

In certain embodiments, Applicant's Fibre Channel communication links 350, 351, 352, 354, 356, and 358, comprise a layered protocol architecture consisting of up to about five layers, the highest defining mappings from other communication protocols onto the FC fabric. Such other communication protocols supported include the Small Computer System Interface ("SCSI") protocols and the internet protocol ("IP"). These supported protocols can be used simultaneously. For example, an FC-AL loop running IP and SCSI protocols can be used for both system-to-system and system-to-peripheral communication, sharing a communication path that is as fast as most mainframe backplanes. This capability eliminates the need for separate I/O controllers, reduces costs, reduces cabling complexity, and reduces board count.

In certain embodiments, communication links 350, 351, 352, 354, 356, and 358, comprise a Fibre Channel architecture with SCSI protocols mapped onto the FC fabric. In these embodiments, the SCSI protocols include Fast SCSI (SCSI-2) at 10 MB/sec., Fast Wide SCSI (SCSI-2), running at 20 MB/sec., and Ultra SCSI (SCSI-3 or Fast-20), which provide data transfer rates of up to 40 MB/sec. In certain embodiments, data storage and retrieval system 320 and host system 390 may be collocated on a single apparatus.

Host system 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host system 390 may include the functionality of storage management type programs known in the art that manage the transfer of data to a data storage and retrieval system, such as the IBM TIVOLI Storage Manager.

The IBM TIVOLI Storage Manager software is described in "Tivoli Storage Manager for Windows Using the Backup-Archive Client," IBM Document Number SH26-4117-01, "Tivoli Storage Manager for Windows Administrator's Guide," IBM Document Number GC35-0410-02, and "Tivoli Storage Manager for Windows Administrator's Reference," IBM Document Number GC35-0411-02, and those IBM publications are incorporated herein by reference. In addition to including known storage management program functions, such as recall and migration, the storage management program 310 would further include additional program instructions to perform the operations of the preferred embodiments of the present invention. The storage management program 310 may be implemented within the operating system of the host system 390 or as a separate, installed application program. Alternatively, storage management program 310 may include device drivers, backup software, and the like.

The data storage and retrieval system 320 comprises a computer system, and manages, for example, a plurality of tape drives and tape cartridges. In such tape drive embodiments, tape drives 330 and 340 may be any suitable tape drives known in the art, e.g., one or more TotalStorage™ tape drives. (Totalstorage is a trademark of IBM Corporation). Similarly, one or more of tape cartridges 370 (FIG. 3) may be any suitable tape cartridge device known in the art, such one or more TotalStorage tape cartridges.

Figure 1:
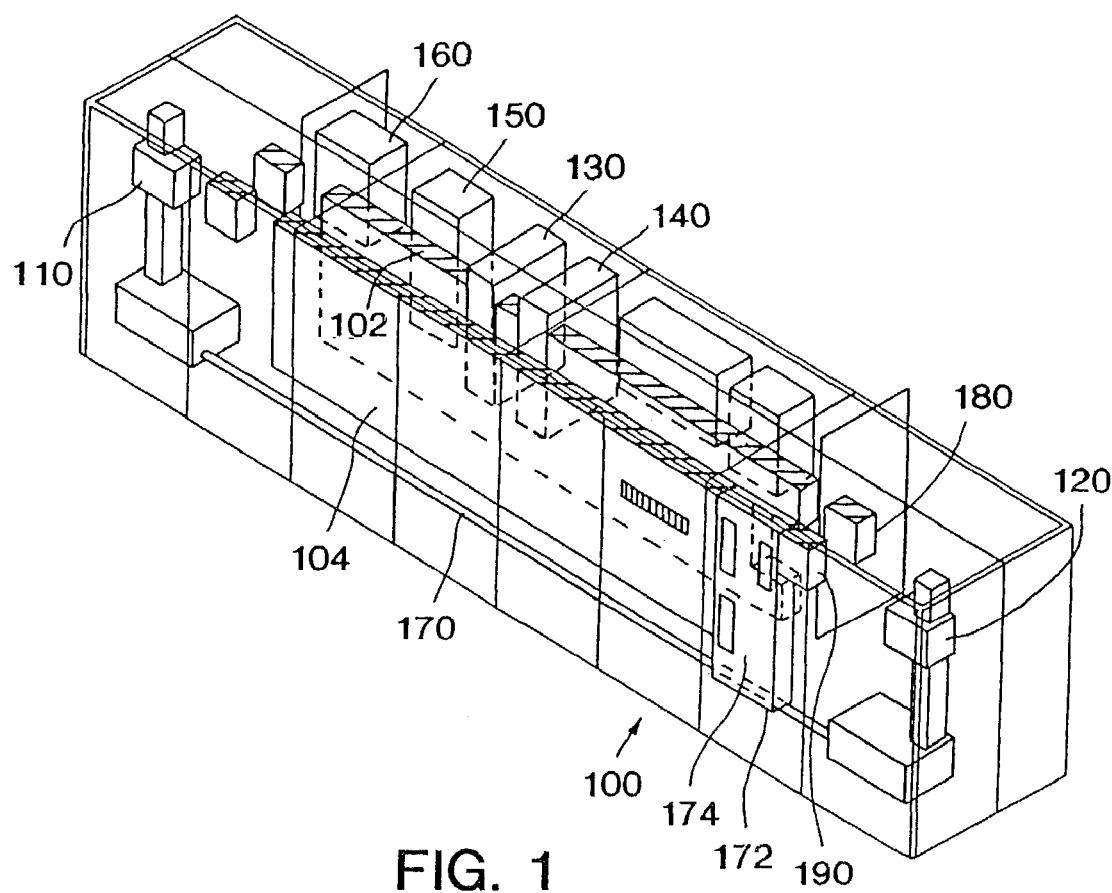
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in a portable container, i.e. a cartridge. Examples of such data storage media include magnetic tapes, magnetic disks of various types, optical disks of various types, electronic storage media, and the like. References made herein to either a "data storage cartridge," or to a "data storage medium," include embodiments wherein the data storage medium is housed within a cartridge and also to embodiments wherein that data storage medium is not disposed in a housing.

Applicant's automated data storage and retrieval system includes one or more accessors, such as accessors 110 and 120. An accessor is a robotic device which retrieves portable data storage media from first storage wall 102 or second storage wall 104, transports that accessed media to data storage devices 130/140 for reading and/or writing data thereon, and returns the media to the proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotally attached to the side of system 100. Portable data storage cartridges can be placed in the system, or in the alternative, removed from the system, via station 172/access door 174.

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 comprises a motion card pack. Such a distributed control network further includes an X/Y movement control card disposed on each accessor, an accessor control card disposed on each accessor, and an operator panel control card disposed in operator input station 150.

Figure 2:
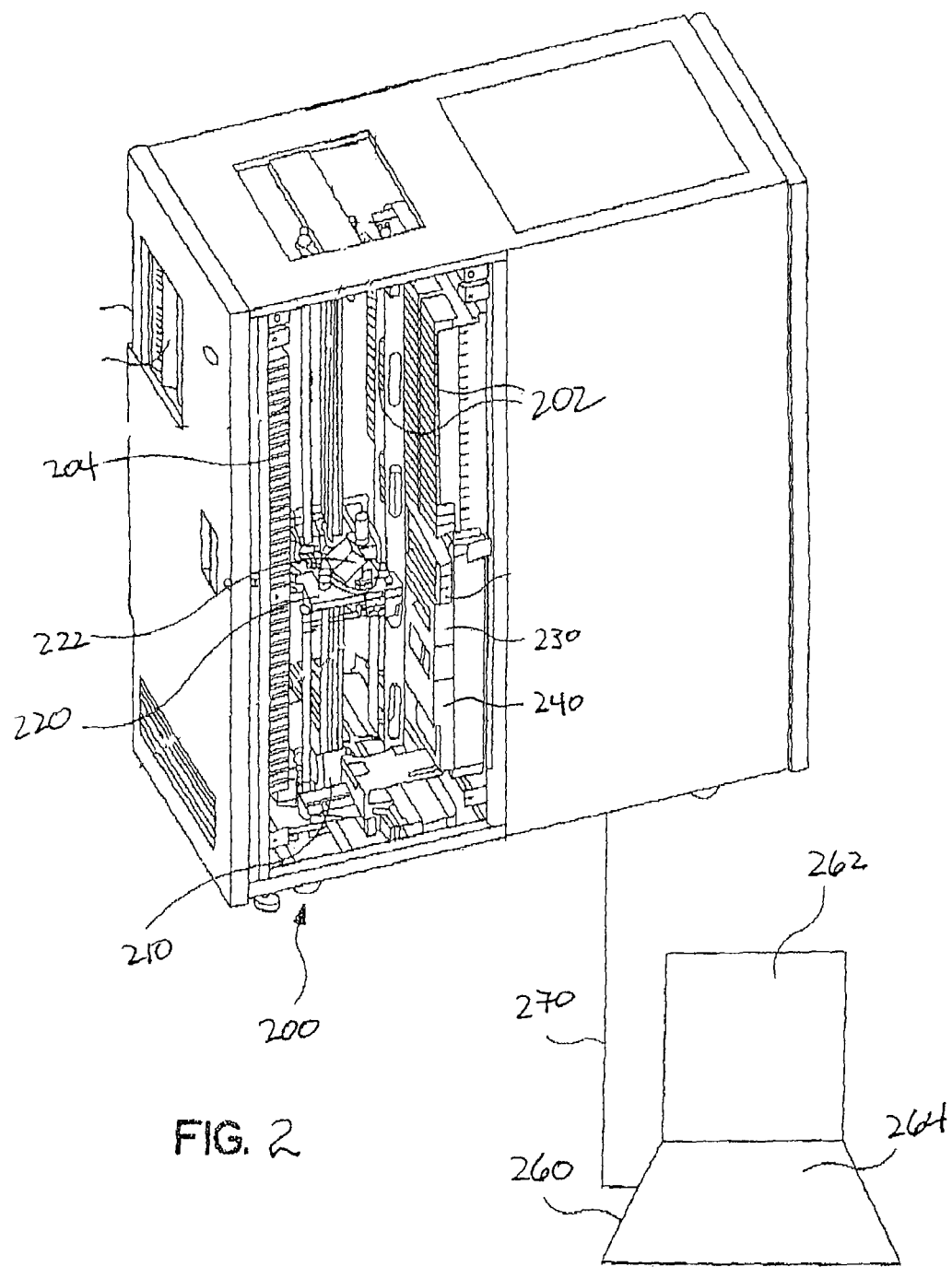
FIG. 2 is a perspective view of a second embodiment of Applicant's data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, and the like.

In certain embodiments, system 200 further includes a controller 160 (not shown in FIG. 2) integral to system 200. In certain embodiments, system 200 includes a distributed control network as described above. In certain embodiments, system 200 includes external controller 260 which communicates with system 200 via communication link 270. In certain embodiments, controller 260 includes display device 262 and data input device 264. Communication link 270 comprises a serial interconnection, such as an RS-232 cable or an RS-432 cable, an ethernet interconnection, a gigabit ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

System 200 further includes one or a plurality of portable data storage cartridges, such as cartridges 370 (FIG. 3), removeably disposed in one or more slots in storage walls 202/204. Each such cartridge contains a data storage medium, i.e. one of data storage media 360 (FIG. 3), internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 230/240. Accessor 210 includes lifting servo section 220 on which is disposed at least one cartridge gripping mechanism 222.

Figure 4:
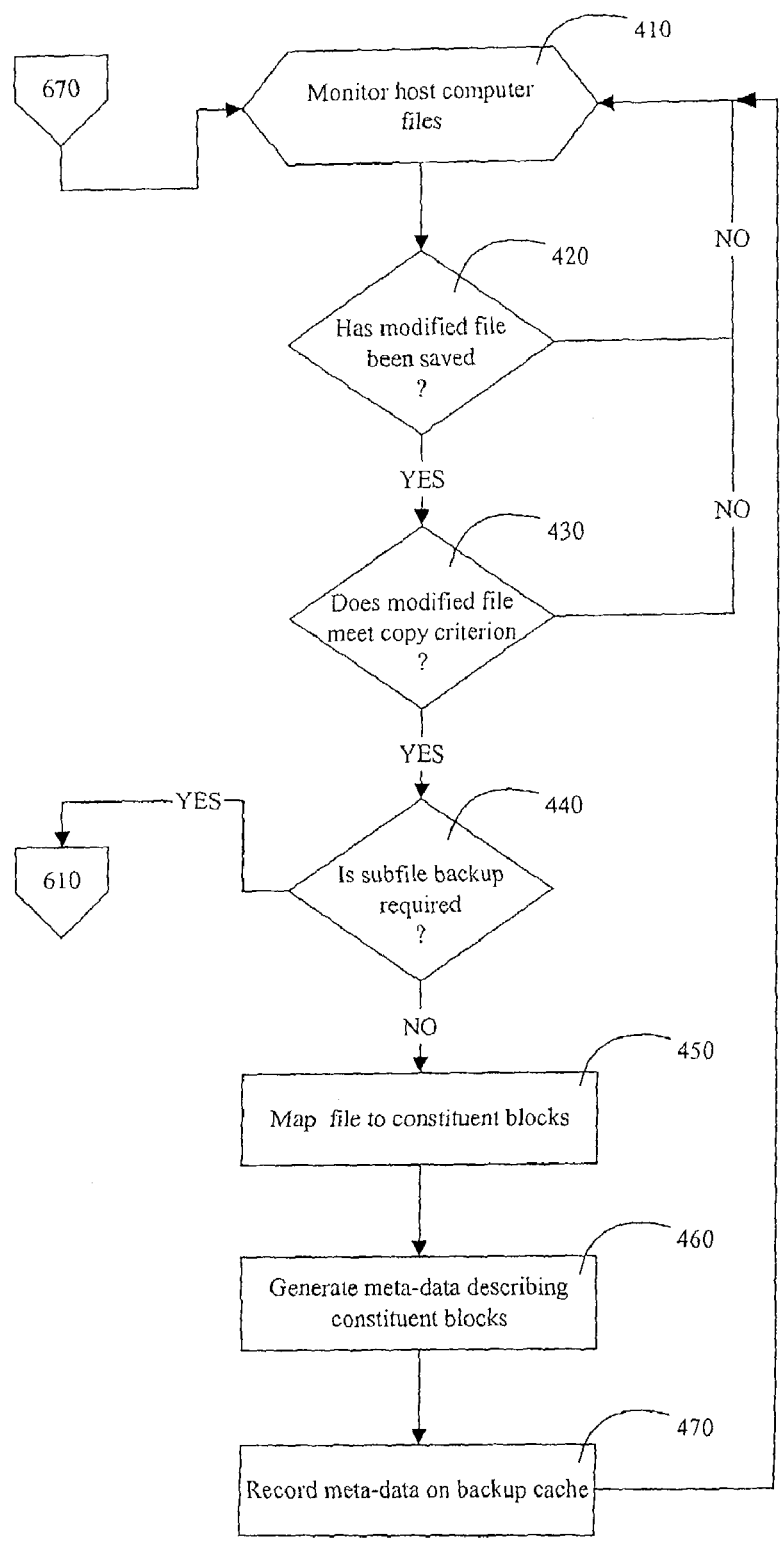
FIG. 4 is a flowchart summarizing the steps of first embodiment of Applicant's method to map one or more computer files.

FIG. 4 summarizes the steps in a first embodiment of Applicants' method wherein the computer files disposed in one or more host computer systems are continuously monitored to identify files that are modified and then saved. Certain of those modified files are mapped and then asynchronously backed-up, i.e. copied, using Applicants' method.

Figure 5:
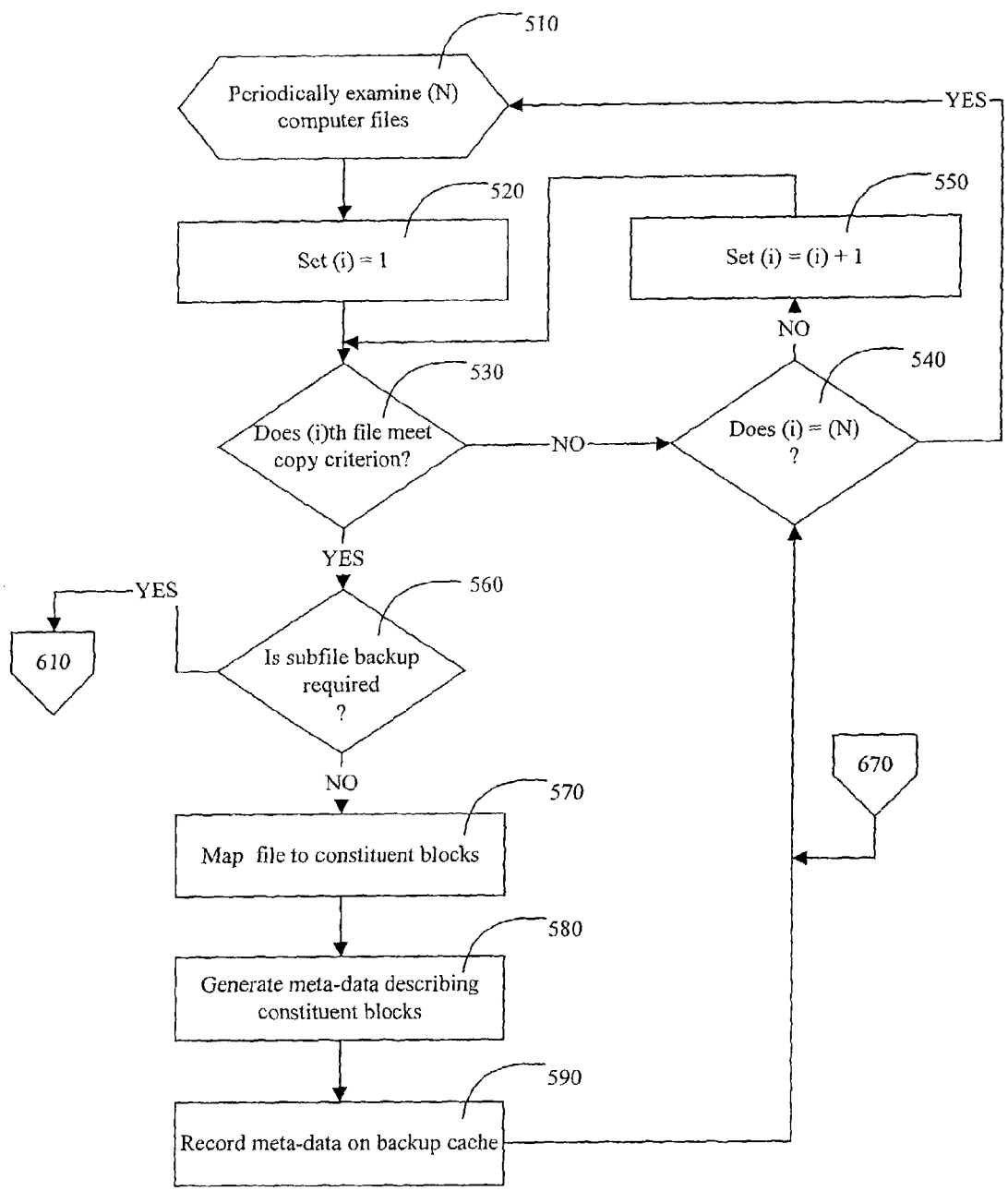
FIG. 5 is a flowchart summarizing the steps of a second embodiment of Applicant's method to map one or more computer files.

In step 410, Applicants' method continuously monitors host computer files stored in one or more host computers. When Applicants' method determines that a host computer file has been modified, then Applicants' method transitions to step 420 wherein Applicants' method determines if that modified file has been saved. If Applicants' method determines in step 420 that the modified file has not been saved, then Applicants' method transitions from step 420 to step 410. Alternatively, if Applicants' method determines in step 420 that the modified file has been saved, then Applicants' method transitions from step 420 to step 430, wherein Applicants' method determines at a first time if that saved files meets one or more copy criteria. Such copy criteria are described below with respect to step 530 (FIG. 5).

If Applicants' method determines in step 430 that the modified file does not meet one or more copy criteria, then Applicants' method transitions from step 430 to step 410. Alternatively, if Applicants' method determines in step 430 that the modified file meets one or more copy criteria, then Applicants' method transitions to step 440 wherein Applicants' method determines if subfile backup is required. Applicants' method to backup one or more subfiles is summarized in FIG. 6 and is described below. If Applicants' method determines in step 440 that subfile backup is required then Applicants' method transitions from step 440 to step 610. Alternatively, if Applicants' method determines in step 440 that subfile backup is not required, then Applicants' method transitions from step 440 to step 450 and begins the process to copy that modified file.

Copying the modified computer file to one or more information storage media directly after step 440, however, can impose significant and undesirable time processing overhead on the host computer. Copying the modified computer file using a SCSI-3 Extended Copy, for example, requires: (i) mapping the computer file to its constituent blocks, (ii) generating meta-data describing those constituent blocks, and (iii) providing that meta-data to a copy manager for execution of the Extended Copy command. If such mapping/meta-data generation is performed contemporaneously with copying of the computer file, substantial and unacceptable processing overheads, i.e. time delays, are sometimes imposed on the host computer. These time delays can, among other things, degrade the performance of that host computer. This processing overhead is particularly burdensome when backing up small files, i.e. files having sizes below about 100 MB.

To alleviate this undesirable processing overhead, Applicant's method transitions from step 440 to step 450 wherein Applicants' method "pre-maps" the modified file to its constituent blocks. The mapping of 450 begins at a second time. In certain embodiments, the mapping of step 450 is performed over two or more time intervals. In these embodiments, the mapping of step 450 may be started and stopped one or more times until the computer file has been completely mapped to its constituent blocks.

After the mapping of step 450 is complete, Applicants' method transitions at a third time to step 460 wherein Applicants' method generates/abstracts meta-data describing the constituent blocks of step 450. In certain embodiments, the meta-data generated in step 460 includes file attributes. In step 470, the meta-data generated in step 460 is recorded at a fourth time. In certain embodiments, this meta-data is stored in the backup cache, such as backup cache 380 (FIG. 3). Applicants' method transitions from step 470 to step 410.

The mapping of step 450, the meta-data generation of step 460, and the recording of step 470, precede actual copying of the computer file. Because Applicants' method pre-maps the modified file in step 450, and generates meta-data describing the constituent blocks in step 460, the actual copying of the modified file proceeds more rapidly because file system APIs need not be called during copying. By determining which blocks need to be copied ahead of time, Applicant's apparatus and method reduces the processing overhead imposed on the one or more host computers at the time of the copy operation.

In certain embodiments, the mapping step, the generating step, and the recording step, are performed approximately contemporaneously, and the copying step is performed at a later time. Thus in certain embodiments, steps 450, 460, and 470, are performed substantially synchronously, while the copying of the modified computer file is performed asynchronously, i.e. at a later time. By "substantially synchronously," Applicants mean within about a second.

In certain embodiments, the time interval $\Delta T_{T4-T1}$ between the fourth time and the first time is less than about a millisecond. In certain embodiments, the time interval $\Delta T_{T4-T1}$ between the fourth time and the first time is less than about 10 milliseconds. In certain embodiments, the time interval $\Delta T_{T4-T1}$ between the fourth time and the first time is less than about 100 milliseconds. In certain embodiments, the time interval $\Delta T_{T4-T1}$ between the fourth time and the first time is less than about a second. In certain embodiments, the time interval $\Delta T_{T4-T1}$ between the fourth time and the first time is less than a minute.

Figure 6:
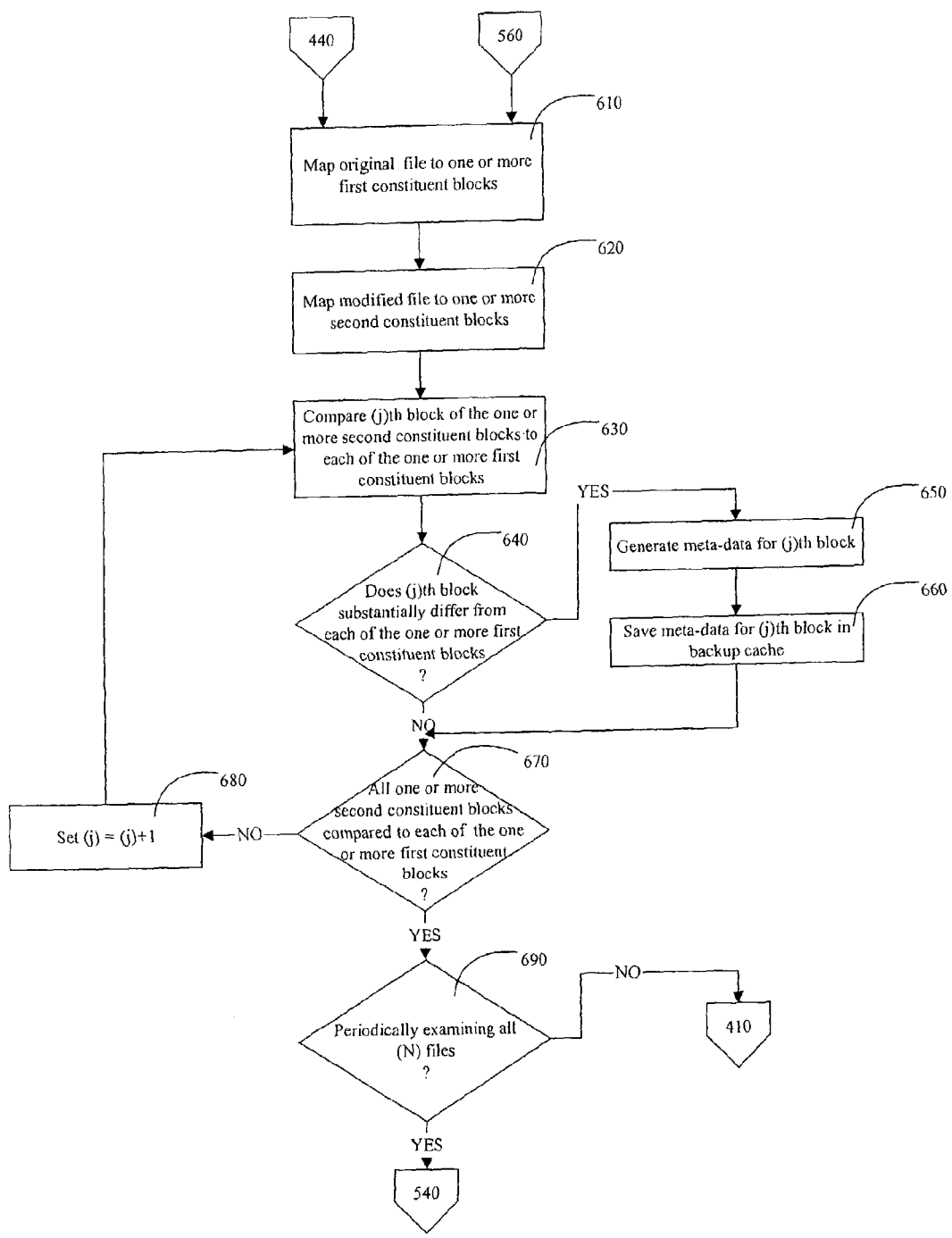
FIG. 6 is a flowchart summarizing the steps of a third embodiment of Applicant's method to map one or more computer files.

FIG. 7 summarizes the steps of Applicants' method to copy pre-mapped files. Referring now to FIG. 7, Applicants' method begins at step 710 wherein meta-data describing one or more pre-mapped files has been saved in an information storage device/medium. In step 720 at fifth time, that meta-data is provided to a copy manager, such as copy manager 312 (FIG. 3), where that fifth time is asynchronous with the fourth time of step 470 (FIG. 4), step 590 (FIG. 5), or step 660 (FIG. 6).

In certain embodiments, the time interval between the fifth time and the fourth time is greater than about 30 minutes. In certain embodiments, the time interval between the fifth time and the fourth time is greater than about 1 hour. In certain embodiments, the time interval between the fifth time and the fourth time is greater than about 10 hours.

In step 730 the copy manager copies one or more host computer files using the meta-data generated in step 460 (FIG. 4), and/or in step 580 (FIG. 5), and/or in step 650 (FIG. 6), and provided to the copy manager in step 720. In certain embodiments, steps 720 and 730 are substantially synchronous.

In certain embodiments, the copy manager, such as copy manager 312, utilizes the SCSI-3 Extended Copy command in step 730 to copy one or more host computer files to one or more information storage media disposed in Applicant's data storage and retrieval system, such as system 100/200. In certain embodiments, in step 720 Applicants' method writes the one or more modified host computer files to one or more portable information storage media, such as one or more of media 360 (FIG. 3) disposed in one or more portable cartridges 370 (FIG. 3).

After the one or more pre-mapped computer files are copied in step 730, Applicants' method transitions to step 740 wherein the meta-data recorded in step 470 (FIG. 4), and/or step 590 (FIG. 5), and/or in step 660 (FIG. 6), is removed from the backup cache, such as backup cache 380 (FIG. 3). After removing the meta-data from the backup cache in step 740, Applicants' method to copy pre-mapped computer files transitions to step 750 and ends. Because Applicants' method to copy computer files proceeds asynchronously, Applicants' method to monitor host computer files, and to pre-map certain of those files, as summarized in FIG. 4, and/or Applicants' method to periodically backup computer files, and to pre-map certain of those files, as summarized in FIG. 4, continue even though Applicants' method to copy pre-mapped computer files summarized in FIG. 7 may end.

As noted above, Applicant's invention includes a method to periodically backup computer files. FIG. 5 summarizes the steps of Applicants' method to periodically examine (N) host computer system files, and to pre-map one or more of those (N) files. In step 510 at a predetermined first time, Applicants' method begins examining those (N) files stored in the host computer system to determine which, if any, of those files meet one or more copy criteria.

In step 520, Applicants' method examines a first file, i.e. (i) is set to 1. In step 530, Applicants' method determines if the (i)th file meets one or more copy criteria. In certain embodiments, the determination of step 530 is based upon the user's operations policies. For example, a user might elect to backup files every ten (10) days even if no changes to those files have been made.

In certain embodiments, step 530 includes determining if the modified file substantially differs from the original file. In certain embodiments, step 530 includes comparing the times at which the original file and modified file were saved. In certain embodiments, files that change often are not repeatedly mapped in step 570. For example, if the original file was saved at a first time TS1, and the modified file was saved at a second time TS2, in certain embodiments step 530 includes comparing the time interval $\Delta T_{TS2-TS1}$ comprising the time interval between times TS1 and TS2. If that $\Delta T_{TS2-TS1}$ is less than a pre-selected interval, then step 530 determines that the (i)th file does not meet a copy criterion. In certain embodiments, the pre-selected interval is set at, for example, about ten (10) minutes. In certain embodiments, that pre-selected interval is set at about sixty (60) minutes. In certain embodiments, that pre-selected interval is set at about twenty-four (24) hours. In certain embodiments, that pre-selected interval is set at about seven (7) days.

In certain embodiments, step 530 includes comparing the sizes of the modified file and the original file. In certain embodiments, step 530 includes comparing a checksum value for the original file, with a checksum value for the modified file. As those skilled in the art will appreciate, a checksum value comprises a numerical value which is based upon the number of set bits in a file. Such a checksum may be 8 bits(modulo 256 sum), 16 bits, 32 bits, or some other size. Such a checksum value is computed by summing the bytes or words comprising the file.

In the event a difference exists in the sizes of the modified file and the original file, then in certain embodiments Applicant's method determines in step 530 that the host computer file meets a copy criterion. Thus, if a first host computer file is changed by deleting certain information, or if a first host computer file is changed by adding new information, then in certain embodiments in step 530 Applicant's method determines that the modified file merits backup, i.e. meets a copy criterion.

If Applicants' method determines in step 530 that the (i)th file does not meet one or more copy criteria, then Applicants' method transitions from step 530 to step 540 wherein Applicants' method determines if all of the host computer files has been examined, i.e. if (i)=(N). If Applicants' method determines in step 540 that all the host computer files have been examined, then Applicants' method transitions from step 540 to step 510. Alternatively, if Applicants' method determines in step 540 that (i) does not equal (N), then Applicants' method transitions from step 540 to step 550 wherein (i) is incremented. Applicants' method then transitions from step 550 to step 530 wherein another host computer file is examined.

If Applicants' method determines in step 530 that the (i)th file meets one or more copy criteria, then Applicants' method transitions from step 530 to step 560 wherein Applicants' method determines if subfile backup is required. Applicants' method to backup one or more subfiles is summarized in FIG. 7 and is described below.

If Applicants' method determines in step 560 that subfile backup is required, then Applicants' method transitions from step 560 to step 610. Alternatively, if Applicants' method determines in step 560 that subfile backup is not required, then Applicants' method transitions from step 560 to step 570 wherein Applicants' method maps the (i)th file to its constituent blocks.

As discussed above, copying the modified file directly after step 560 can impose significant and undesirable time processing overhead on the host computer. To alleviate this undesirable processing overhead, Applicant's method in step 570 "pre-maps" a file to its constituent blocks, as described above with reference to step 450 (FIG. 4). Thereafter, in step 580 Applicants' method generates meta-data describing those constituent blocks, as described above with reference to step 460 (FIG. 4).

In certain embodiments, the mapping of step 570 is performed over two or more time intervals. In these embodiments, the mapping of step 570 may be started and stopped one or more times until the second file has been completely mapped to its constituent blocks. In step 580, Applicants' method at a third time generates meta-data describing the mapped file's constituent blocks. In certain embodiments, the meta-data generated in step 580 includes file attributes. In step 590, the meta-data generated in step 580 is recorded at a fourth time in a backup cache, such as backup cache 380 (FIG. 3). In certain embodiments, steps 570, 580, and 590 are performed substantially synchronously. Applicants' method transitions from step 590 to step 540 and continues.

Referring again to FIG. 7, at a fifth time subsequent to the fourth time of step 590, Applicants' method to copy one or more pre-mapped files described above, and summarized in FIG. 7, provides in step 720 the meta-data recorded in step 590 (FIG. 5) to a copy manager, such as copy manager 312 (FIG. 3). In step 730, the copy manager copies zero or more of the (N) computer files of step 510 (FIG. 5) found to meet one or more copy criteria in step 530. In certain embodiments, the copying of step 730 is performed over two or more time intervals. In these embodiments, the copying of step 730 may be started and stopped one or more times until the file has been completely copied. In step 740, the meta-data recorded in step 590 (FIG. 5) is removed from the backup cache.

FIG. 6 summarizes the steps of Applicant's method to pre-map subfiles. In these embodiments, only one or more portions of a host computer file, comprising, for example, the modified portions thereof, are pre-mapped in preparation for later copying. These embodiments involve comparing a first host computer file, i.e. the original host computer file, to a second host computer file, i.e. the modified file. A first embodiment includes the steps of FIG. 6 in combination with steps 410, 420, 430, and 440, as shown in FIG. 4. A second embodiment includes the steps of FIG. 6 in combination with steps 510, 520, 530, 540, 540, and 560, as shown in FIG. 5.

In step 610, the original host computer file is mapped to one or more first constituent blocks. In step 620, the modified host computer file is mapped to one or more second constituent blocks. In step 630, each of the one or more second constituent blocks is individually compared to each of the one or more first constituent blocks. If Applicants' method determines in step 640 that the (j)th block of the one or more second constituent blocks substantially differs from each of the blocks comprising the one or more first constituent blocks, then in step 650 meta-data for that (j)th block is generated. In step 660, the meta-data generated in step 650 is saved in the backup cache. After step 660, Applicants' method transitions to step 670.

If it is determined in step 640 that the (j)th block does not substantially differ from each of the one or more first constituent blocks, then Applicants' method transitions to step 670. In step 670, Applicants' method determines if each of the blocks comprising the one or more second constituent blocks has been compared to each of the one or more first constituent blocks.

If Applicants' method determines in step 670 that each of the one or more second constituent blocks has not been compared to each of the one or more first constituent blocks, then Applicants' method transitions from step 670 to step 680 wherein (j) is incremented to (j)+1. Thereafter, Applicant's method transitions from step 680 to step 630 to continue the comparison of the blocks comprising the one or more second constituents blocks with each of the blocks comprising the one or more first constituent blocks.

Alternatively, if Applicants' method determines in step 670 that each of the one or more second constituent blocks has been compared to each of the one or more first constituent blocks, then Applicants' method transitions from step 670 to step 680 wherein Applicants' method determines if all (N) files are being examined. If Applicants' method determines in step 690 that all (N) host computer files are being examined, then Applicants' method transitions from step 690 to step 540 (FIG. 5). Alternatively, if Applicants' method determines in step 690 that all (N) host computer files are not being examined, then Applicants' method transition from step 690 to step 410 (FIG. 4).

The embodiments of Applicants' method recited in FIGS. 4 and 5 may be implemented separately. Moreover, in certain embodiments the individual steps recited in FIGS. 4, 5, 6, and/or 7 may be combined, eliminated, or reordered.

Applicants' invention includes an article of manufacture, such as Applicants' data storage and retrieval system, comprising a computer useable medium having computer readable program code disposed therein to pre-map one or more computer files to constituent blocks, and to asynchronously copy those one or more computer files using the embodiments of Applicants' method described herein. Applicants' invention further includes computer program products embodied as program code stored in one or more memory devices, such as a magnetic disk, a magnetic tape, or other non-volatile memory device disposed in Applicants' data storage device, to pre-map one or more computer files to constituent blocks, and to asynchronously copy those one or more computer files using the embodiments of Applicants' method described herein. The programming of the present invention may comprise a computer program product embodied as program code stored in a storage device, such as a magnetic disk drive or memory, etc., in a computer, or may comprise an article of manufacture, such as a CD ROM, magnetic tape, etc. While the preferred embodiments of the present invention have been illustrated in detail, it should be apparent that modifications and adaptations to those embodiments may occur to one skilled in the art without departing from the scope of the present invention as set forth in the following claims.

We claim:

1. A method to copy a modified host computer file, comprising the steps of:
    supplying a host computer comprising host computer files, an operating system, and a storage management program;
    supplying a backup cache external to said host computer;
    supplying a copy manager external to said host computer, wherein said copy manager is in communication with said host computer;
    supplying a data storage and retrieval system external to said host computer and external to said copy manager, wherein said data storage and retrieval system is in communication with said host computer and with said copy manager;
    continuously monitoring said host computer files by said storage management program;
    determining, by said storage management program, that a host computer file has been modified;
    determining, by said storage management program, if said modified host computer file has been saved;
    when said modified host computer file has been saved:
    determining, by said storage management program, if said modified computer file meets a copy criteria:
    mapping, by said storage management program, said modified computer file to one or more constituent blocks;
    generating, by said storage management program, meta-data describing said one or more constituent blocks;
    storing, by said storage management program, said meta-data in said backup cache;
    providing, by said storage management program, said meta-data to said copy manager; and
    copying, by said copy manager, said modified host computer file to one or more information storage media disposed in the data storage and retrieval system;
    wherein said determining step, said mapping step, said generating step, and said storing step, are all performed within a time interval less than a millisecond; and
    wherein a time interval between said storing step and said providing step is greater than about 10 hours.

2. The method of claim 1, wherein said copying step further comprises using a Small Computer System Interface-3 Extended Copy command.

3. The method of claim 1, wherein said mapping step, said generating, and said recording step, further comprise the steps of:
    receiving-a host computer file;
    mapping said host computer file to one or more first constituent blocks;
    receiving a modified host computer file;
    mapping said modified host computer file to one or more second constituent blocks;
    comparing each of said one or more first constituent blocks to each of said one or more second constituent blocks; and
    recording in said backup cache meta-data describing each of said one or more second constituent blocks that differs from each of said one or more first constituent blocks.

4. An article of manufacture comprising host computer files, an operating system, a storage management program, and a computer readable medium having computer readable program code disposed therein to copy computer files, the computer readable program code comprising a series of computer readable program steps to effect:
    continuously monitoring, by said storage management program, said host computer files;
    determining, by said storage management program, that a host computer file has been modified;
    determining, by said storage management program, if said modified host computer file has been saved;
    when said modified host computer files has been saved:
    determining, by said storage management program, if said modified computer file meets a copy criteria;
    mapping, by said storage management program, said modified computer file to one or more constituent blocks;
    generating, by said storage management program, meta-data describing said one or more constituent blocks;
    storing, by said storage management program, said meta-data in a backup cache, wherein said backup cache is external to said host computer;
    providing, by said storage management program, said meta-data to an interconnected copy manager, wherein said copy manager is external to said article of manufacture, and wherein said copy manager is in communication with said article of manufacture and with a data storage and retrieval system which is external to both said article of manufacture and to said copy manager;

wherein said determining, said mapping, said generating, and said storing, are all performed within a time interval less than a millisecond; and wherein a time interval between said storing and said providing is greater than about 10 hours.

5. The article of manufacture of claim 4, wherein said computer readable program code further comprises a series of computer readable program steps to effect using a Small Computer System Interface-3 Extended Copy Command.

6. The article of manufacture of claim 4, wherein said computer readable program code further comprises a series of computer readable program steps to effect:
   receiving a host computer file;
   mapping said host computer file to one or more first constituent blocks;
   receiving a modified host computer file;
   mapping said modified computer file to one or more second constituent blocks;
   comparing each of said one or more first constituent blocks to each of said one or more second constituent blocks; and
   recording in said backup cache meta-data describing each of said one or more second constituent blocks that differs from each of said one or more first constituent blocks.

7. A storage management program written to an information storage medium disposed in a host computer comprising host computer files and an operating system wherein said storage management program is usable with a programmable computer processor for copying a host computer file using a backup cache and a copy manager, comprising:
   computer readable program code which causes said programmable computer processor to continuously monitor said host computer files;
   computer readable program code which causes said programmable computer processor to determine that a host computer file has been modified;
   computer readable program code which causes said programmable computer processor to determine if said modified computer file has been saved;
   computer readable program code which, when said modified computer has been saved, causes said programmable computer processor to:
   determine if said modified computer file meets a copy criteria;
   map said modified computer file to one or more constituent blocks;
   generate meta-data describing said one or more constituent blocks;
   store said meta-data in a backup cache, wherein said backup cache is external to said host computer;
   provide said meta-data to an interconnected copy manager wherein said copy manager is external to said article of manufacture, and wherein said copy manager is in communication with said article of manufacture and with a data storage and retrieval system which is external to both said article of manufacture and to said copy manager;
   wherein said determining step, said mapping step, said generating step, and said storing step, are all performed within a time interval less than a millisecond; and
   wherein a time interval between said storing step and said providing step is greater than about 10 hours.

8. The computer program product of claim 7, wherein said computer readable program code which causes said programmable computer processor to copy said computer file further comprises computer readable program code to use the Small Computer System Interface-3 Extended Copy command.

9. The computer program product of claim 7, further comprising:
   computer readable program code which causes said programmable computer processor to receive a host computer file;
   computer readable program code which causes said programmable computer processor to map said host computer file to one or more first constituent blocks;
   computer readable program code which causes said programmable computer processor to receive a modified host computer file;
   computer readable program code which causes said programmable computer processor to map said modified computer file to one or more second constituent blocks;
   computer readable program code which causes said programmable computer processor to compare each of said one or more first constituent blocks to each of said one or more second constituent blocks; and
   computer readable program code which causes said programmable computer processor to record in said backup cache meta-data describing each of said one or more second constituent blocks that differs from each of said one or more first constituent blocks.

* * * * *